Nov. 18, 1969  W. J. PETERS ET AL  3,479,056
TRAILER SAFETY HITCH
Filed April 12, 1968
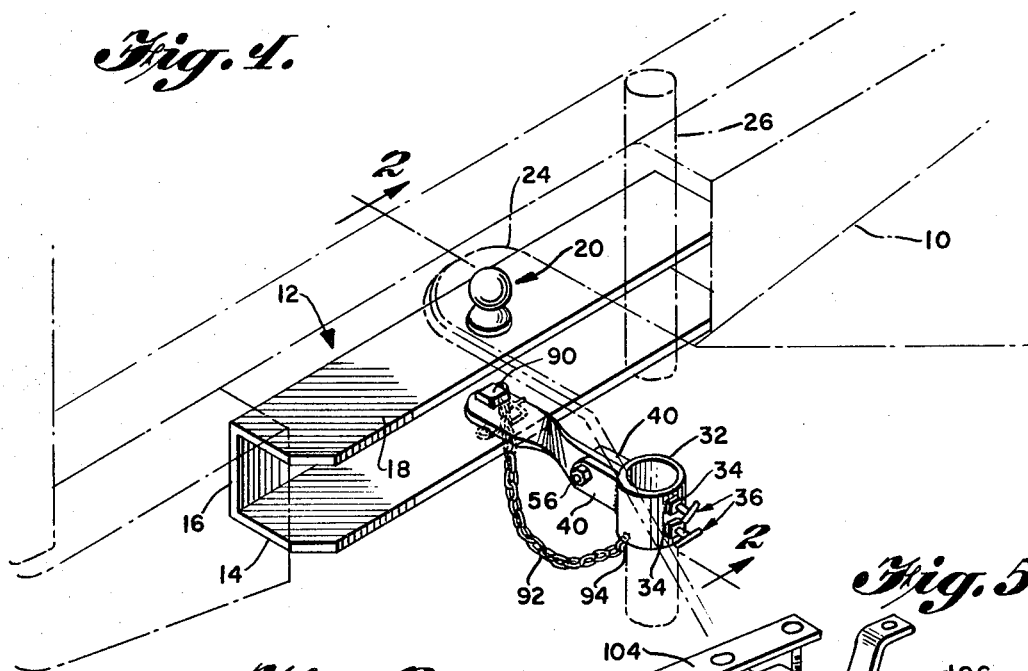
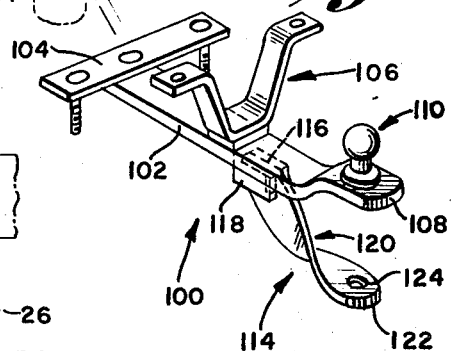
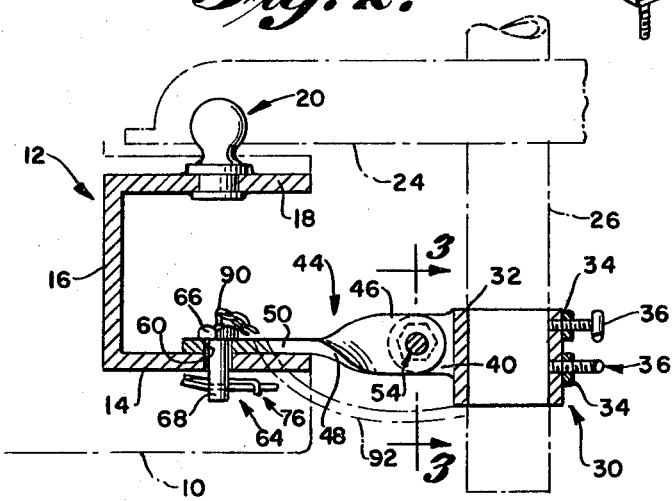
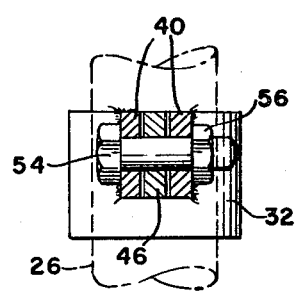
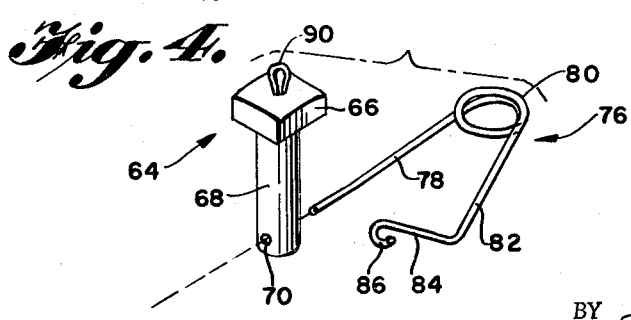
INVENTOR
William J. Peters
BY *Shoemaker and Mattare*
ATTORNEYS United States Patent Office 3,479,056
Patented Nov. 18, 1969

3,479,056
TRAILER SAFETY HITCH
William J. Peters, P.O. Box 152,
Grass Valley, Calif. 95945
Filed Apr. 12, 1968, Ser. No. 720,813
Int. Cl. B60d 1/12, 1/06
U.S. Cl. 280—461     10 Claims

ABSTRACT OF THE DISCLOSURE

A tubular portion is adapted to receive the stand pipe of a trailer and threaded locking members are manually operable to securely connect the tubular portion to a stand pipe. A connector means is pivotally interconnected at one end thereof to the tubular portion and is pivotally interconnected at the opposite end thereof to a portion which is fixed with respect to an associated vehicle. A locking pin extends through a hole in the outer end of the connector means and an aligned hole in the fixed portion of the vehicle so that the device provides an auxiliary connection between a trailer and a vehicle.

Background of the invention

The present invention provides an auxiliary connection between a trailer and an associated towing vehicle.

The purpose of the present invention is to provide an auxiliary safety connection in addition to the conventional interconnection in the form of a ball and socket arrangement. The ball member is usually carried by a fixed portion secured to an associated vehicle, and the conventional trailer tongue is provided with a socket portion adapted to fit over the ball member and be locked thereon.

In most jurisdictions, a safety chain must be attached between the trailer and the towing vehicle to serve as a safety means in case the ball and socket connection should break or become loose.

However, the provision of an attaching chain does not eliminate the hazards which arise when the main ball and socket connection is not effective. If the ball and socket connection is disconnected for one reason or another, the trailer is sufficiently loose so that it will whip from side to side and can come forward into the towing vehicle if the towing vehicle should slow down as when braking. This undesired movement of the trailer with respect to the vehicle can cause the safety chain to snap so that the trailer would be completely disconnected from the associated vehicle.

Summary of the invention

The auxiliary connection provided in the present invention includes a tubular member which can be locked to the stand pipe of a trailer, and a rigid connector means is pivotally interconnected between the tubular portion and a part fixed to the vehicle so that the vehicle and trailer will be rigidly interconnected at all times, while at the same time enabling the necessary degree of relative movement between the vehicle and the trailer.

With the trailer safety hitch of the present invention, there is no chance of loosing control of the trailer if the ball and socket conventional connection should become ineffective. The trailer safety hitch of the present invention will retain the trailer in the same relative position with respect to the towing vehicle as the conventional ball and socket interconnection. The trailer cannot move forwardly or rearwardly with respect to the vehicle, and the trailer tongue will remain in the same horizontal relationship as when held in place by the ball and socket connection.

The trailer will be constrained to follow the towing vehicle in a straight line and there will be no side sway or whipping of the trailer with respect to the towing vehicle since there is no slack therebetween when the trailer safety hitch is carrying the entire towing load between the vehicle and the trailer.

Brief description of the drawing

FIG. 1 is a top perspective view illustrating the trailer safety hitch of the present invention interconnected with a structure fixed to an associated towing vehicle;

FIG. 2 is a sectional view on an enlarged scale taken substantially along line 2—2 of FIG. 1 looking in the direction of the arrows;

FIG. 3 is a sectional view taken substantially along line 3—3 of FIG. 2 on an enlarged scale and looking in the direction of the arrows;

FIG. 4 is a top perspective view illustrating the pivot pin and retainer means of the invention; and FIG. 5 is a top perspective view illustrating a modified tow bar for association with an automobile to receive the trailer safety hitch of the present invention.

Description of the preferred embodiments

Referring now to the drawings wherein like reference characters designate corresponding parts throughout the several views, as seen particularly in FIGS. 1 and 2, the rear end of a suitable towing vehicle such as a camper or the like is indicated in phantom lines by reference numeral 10. A typical support structure 12 formed of rigid material such as steel or the like is secured to the rear end of the vehicle. This support structure 12 includes a lower generally horizontally disposed wall portion 14 which joins with a substantially vertically extending wall portion 16 which in turn joins with an upper horizontally extending wall portion 18 disposed substantially parallel with the lower wall portion 14. A conventional ball means 20 is rigidly secured to the upper surface of wall portion 18 for attachment to the conventional socket portion in the tongue of a trailer in a well known manner. The tongue of the trailer is indicated in phantom line by reference numeral 24, the conventional stand pipe of the trailer being indicated by phantom line 26.

It is apparent that the ball and socket interconnection between the vehicle and the trailer provides the main interconnection therebetween. The trailer safety hitch of the present invention provides an auxiliary connection between the vehicle and the trailer, the trailer safety hitch being indicated generally by the reference numeral 30.

The hitch 30 includes a tubular portion 32 formed of heavy-duty steel and being of a dimension so as to slidably receive the stand pipe 26 of the trailer. Locking means for securely connecting the tubular portion to the stand pipe of the trailer includes a pair of threaded nuts 34 suitably secured as by welding to the outer surface of tubular portion 32, each of these nuts receiving a threaded T-bolt 36. It is apparent that these T-bolts may be manually adjusted so as to lock the tubular portion on a desired part of an associated stand pipe.

A pair of spaced ears 40 are rigidly secured as by welding to the opposite side of the tubular member 32, these ears being secured to the tubular portion adjacent the upper edge thereof as seen in the drawings. Accordingly, if the entire assembly is turned upside down, the position of the connector means hereinafter described and supported by the ears can be automatically lowered simply by such inversion of the components.

The connector means is indicated generally by reference numeral 44 and includes one end portion 46 which is generally vertically disposed, the connector means including a twisted intermediate portion 48 and another opposite end portion 50 which is generally horizontally disposed.

The end portion 46 of the connector means is pivotally interconnected with the tubular portion by means of a pivot bolt 54 extending through aligned holes provided in the ears 40 and the end portion 46 of the connector means, a lock nut 56 being threaded on the outer end of bolt 54 as seen most clearly in FIG. 3 for retaining the components in the assembled relationship illustrated.

The end portion 50 of the connector means is provided with a hole 60 therethrough which is adapted to be aligned with a suitable hole provided in the wall portion 14 of the supporting structure 12. A pivot pin indicated generally by reference numeral 64 includes an enlarged head portion 66 and a reduced shank portion 68 which is adapted to fit loosely through the aligned holes in the end portion 50 of the connector means and the wall portion 14. In a typical example, the pivot pin may have a diameter of approximately 5/8 of an inch, while the holes may be 3/4 of an inch in diameter. Accordingly, this loose fit enables the end portion 50 to be freely movable with respect to the supporting structure until some unforeseen circumstance may cause failure of the conventional ball connection. Additionally, this loose fit permits the end portion 50 to assume a slight angular relationship with respect to the supporting structure to facilitate movement on uphill and downhill grades. It will be noted as seen in FIG. 2 that these holes are aligned with one another directly beneath the ball structure 20 so that the auxiliary connection is adapted to pivot about the same vertical pivot axis as the main ball and socket connection between the vehicle and the trailer.

As seen particularly in FIG. 4, the lower end of the shank portion 68 of the pivot pin is provided with a hole 70 extending diametrically therethrough.

A retainer means indicated generally by reference numeral 76 may be formed of spring steel or the like and includes a first elongated portion 78 adapted to fit through the hole 70. Portion 78 joins with a circular resilient portion 80 which in turn joins with an elongated part 82. The part 82 joins with a portion of the retainer means 84 extending substantially normally therefrom, portion 84 terminating in a hook-like end portion 86 which is adapted to fit over part of the first-mentioned portion 78 of the retainer means for holding the retainer means in operative position after the portion 78 thereof has been inserted through the hole 70 of the pivot pin. The retainer means accordingly serves to retain the pivot pin in the operative position illustrated in FIG. 2.

An eye member 90 is secured to the upper surface of the enlarged head 66 of the pivot pin. A stainless steel chain 92 has one end thereof secured to the eye member 90, the opposite end of the chain being secured to an eye 94 which in turn is attached to the outer surface of the tubular portion 32. This chain serves to ensure that the pivot pin is not lost when the parts are in disassembled relationship.

Referring now to FIG. 5 of the drawings, a tow bar assembly is indicated generally by reference numeral 100 and is adapted to be secured to a conventional automobile. This assembly includes a longitudinally extending portion 102 having a laterally extending attaching member 104 secured to the rear end thereof. An upwardly extending V-bracket 106 is also attached to the upper surface of longitudinal member 102. The forward end 108 of the longitudinal member 102 extends upwardly and has a conventional ball attaching means 110 secured to the upper surface thereof.

An adapter means indicated generally by reference numeral 114 includes a first generally vertically extending end portion 116 which is suitably secured as by welding in place between depending plate members 118 rigidly secured to the undersurface of longitudinal member 102.

The adapter means includes an intermediate twisted portion 120 which joins with an opposite substantially horizontally disposed end portion 122 having a hole 124 formed therethrough.

It is apparent that when the tow bar assembly as shown in FIG. 5 is attached to the undersurface of a vehicle, the ball member 110 will serve to receive the socket of the tongue of an associated trailer, while the end portion 122 having the hole 124 therethrough is adapted to support the outer end of the connector means and to receive the pivot pin therethrough so as to mount the components in the same general relationship to one another as illustrated in FIG. 2.

When it is desired to utilize the trailer safety hitch of the present invention, the tubular portion of the hitch is slidably disposed on the stand pipe of the trailer and adjusted to the correct height, whereupon the locking members 36 are tightened to hold the tubular portion in place.

The connector means is then adjusted so as to have the hole formed through the outer end thereof in alignment with a hole provided on a fixed portion of the support structure connected with the associated vehicle. The pivot pin is then inserted through these aligned holes, this pivot pin being of steel or suitable material which will not shear in use. The retainer means 76 is then mounted in the operative position illustrated in FIG. 2 as to retain the components in the assembled position The pivot pin serves to provide a vertical pivot axis about which the trailer safety hitch is adapted to move.

The opposite end of the connector means is pivotally interconnected with the tubular portion for pivotal movement about a substantially horizontal axis, and accordingly, the hitch of the present invention is adapted to accommodate all of the various relative movements which may occur between the towing vehicle and the associated trailer.

As this invention may be embodied in several forms without departing from the spirit or essential characteristics thereof, the present embodiment is therefore illustrative and not restrictive.

I claim:

1. The combination with a trailer tongue of a trailer safety hitch, a standpipe depending from said tongue, said safety hitch comprising a tubular portion for receiving the stand pipe, locking means for securely connecting said tubular portion to said stand pipe of a trailer, connector means movably interconnected with said tubular portion at one end thereof, the opposite end of said connector means including means for movably interconnecting said opposite end of the connector means to a fixed portion carried by an associated vehicle to provide an auxiliary connection between a trailer and a vehicle.

2. Apparatus as defined in claim 1 wherein said locking means is selectively adjustable for locking said tubular portion to different parts of an associated stand pipe of a trailer.

3. Apparatus as defined in claim 1 wherein said connector means is pivotally interconnected with said tubular portion at said one end of the connector means.

4. Apparatus as defined in claim 3 wherein said one end of the connector means is mounted for pivotal movement about a generally horizontal axis.

5. Apparatus as defined in claim 4 wherein the other end of said connector means is mounted for pivotal movement about a generally vertical axis.

6. Apparatus as defined in claim 1 wherein said opposite end of the connector means has a hole formed therethrough so as to permit said opposite end of the connector means to pivot about a generally vertical axis.

7. Apparatus as defined in claim 1 wherein said one end of the connector means is generally vertically disposed, said other end of the connector means being generally horizontally disposed, said opposite ends of the connector means being interconnected by a twisted intermediate portion.

8. Apparatus as defined in claim 1 including a first portion disposed in fixed relationship to an associated towing vehicle and a second portion disposed in fixed position relative to said associated vehicle, said first fixed portion supporting a ball portion, said second fixed portion being disposed beneath said first fixed portion and having a hole formed therethrough, said other end of the connector means having a hole being aligned with said first-mentioned hole, and a pivot pin extending through said holes to pivotally interconnect said other end of the connector means with said second fixed portion.

9. Apparatus as defined in claim 8 wherein said one end of the connector means is pivotally interconnected with said tubular portion for pivotal movement about a substantially horizontal axis.

10. Apparatus as defined in claim 9 wherein said connector means is of such a construction that said one end thereof is generally vertically disposed and said other end thereof is generally horizontally disposed, said opposite ends being interconnected by an intermediate twisted portion.

References Cited

UNITED STATES PATENTS

| | | | |
|---|---|---|---|
| 1,546,984 | 7/1925 | Howell | 280—475 |
| 1,585,560 | 5/1926 | Randolph | 280—461 |
| 2,650,101 | 8/1953 | Fankfother | 280—457 |
| 2,738,206 | 3/1956 | Loughner | 280—461 |
| 3,393,924 | 7/1968 | Silver | 280—461 |

LEO FRIAGLIA, Primary Examiner

U.S. Cl. X.R.

280—475